(12) United States Patent
Bhargava

(10) Patent No.: US 6,252,753 B1
(45) Date of Patent: Jun. 26, 2001

(54) ENERGY SERVICE STABILIZER

(75) Inventor: Bharat Bhargava, Walnut, CA (US)

(73) Assignee: Southern California Edison Co., Rosemead, CA (US)

( * ) Notice: Subject to any disclaimer, the term of this patent is extended or adjusted under 35 U.S.C. 154(b) by 0 days.

(21) Appl. No.: 09/215,996

(22) Filed: Dec. 18, 1998

(51) Int. Cl.$^7$ .................................................. H02H 3/00
(52) U.S. Cl. ........................... 361/62; 361/21; 361/66; 361/115; 361/51
(58) Field of Search ............................ 361/1, 18, 62, 361/64, 66, 115, 38, 51, 20, 21

(56) References Cited

U.S. PATENT DOCUMENTS

| | | | |
|---|---|---|---|
| 4,051,427 | * 9/1977 | Kilgore et al. | 322/99 |
| 5,376,828 | 12/1994 | Kim et al. | 307/64 |
| 5,384,696 | * 1/1995 | Moran et al. | 363/40 |
| 5,627,708 | * 5/1997 | Lee | 361/18 |

FOREIGN PATENT DOCUMENTS

| | | | |
|---|---|---|---|
| 1256127 | 9/1986 | (JP) | H02P/9/04 |
| 5260663 | 10/1993 | (JP) | H02J/3/24 |
| 8126204 | 5/1996 | (JP) | H02P/9/04 |
| 700912 | 11/1979 | (SU) | H02P/9/04 |
| 1257800 | 9/1986 | (SU) | H02P/9/14 |

* cited by examiner

*Primary Examiner*—Stephen W. Jackson
(74) *Attorney, Agent, or Firm*—Sheldon & Mak

(57) ABSTRACT

An electrical power distribution system having geographically separated plural generation stations and geographically separated loads is improved by dynamically offsetting a nominal real power operating point of a main control system driving a power control element that variably feeds electrical power onto a network of transmission lines between the stations and the loads in response to deviations in frequency and/or phase of alternating current power on the network. The generation station can include an actuator control circuit for driving the control element in response to a power setting signal, the actuator control circuit incorporating a delay component, an offset signal connection downstream of the actuator control circuit bypassing the delay component. Preferably the system further includes means for monitoring a threshold level of the deviations, and means for inhibiting the means for dynamically offsetting until the deviations exceed the threshold level. Thus the real power compensation is applied selectively under high levels of power transfer between geographically distant locations, when the system has a dominant characteristic frequency of oscillation that is lower than an ordinarily dominant local characteristic frequency of the system. Also disclosed are methods for improving stability of a power distribution system.

38 Claims, 8 Drawing Sheets

ENERGY SERVICE STABILIZER

BACKGROUND

The present invention relates to energy service and distribution networks, and more particularly to networks having multiple generation sources and loads that are geographically separated by distances greatly in excess of one hundred miles.

Large industrial load centers like Los Angeles, San Francisco, New York, etc., in the United States often import up to 40% of their power from outside resources. The major load centers are often part of an extensive electrical power grid. In most of the country, the transmission paths which bring this power are fairly long as the generation is located at far away places, and they are generally very heavily loaded. In addition to the thermal limitations on some transmission lines or other series line components, the transmission of power on these long paths is limited by transient and dynamic instability at high levels of power imports. The transmission paths are also, at times, heavily loaded because of unscheduled power flow or loop flow on these paths. This limits the capability of theses systems to import power. Levels of import beyond an acceptable limit results in power oscillations between the different regions of the system and can often result in system breakups. These oscillations generally occur at frequencies in the range of 0.2–0.8 Hz. Such oscillations between the northwest and southwest also lead to a major system disturbance in the western United States on Aug. 10, 1996.

The Western States Coordinating Council (WSCC) system is a very large, inter-connected system and covers a wide geographical area. Because of the large power system connected with the long transmission lines, some of the major areas can suffer from power system oscillations with respect to other areas. These inter-area oscillations occur at very low frequencies ranging between 0.20 and 1.0 Hz. The large load/generation centers act like masses in a spring-mass system, whereas the transmission lines act as springs giving rise to a multitude of frequencies in the above range. These low oscillation frequencies are typical of large masses connected by a relatively weak transmission system and thus limit the power transfers on the interconnected transmission lines. These oscillations occur when two large areas in an interconnected power system swing with respect to each other. This swing is characterized by power flow back and forth from one area to another. Normally such power flow oscillations are damped by the system damping, but if the interconnecting system is relatively weak, the oscillations can grow also. Moreover, major areas are often influenced by two or more distant areas, oscillations of different frequencies being superimposed.

FIG. 1 shows some of the large power generation/load areas in an existing power network of the southwestern United States. The areas are represented as masses and the transmission lines are represented as springs connected to these areas. Some of the major areas in the WSCC system of interest are:

1. The Pacific Northwest, including the western part of Canada, Washington and Oregon, designated Area M1;
2. Northern California, including PG&E, SMUD, etc., designated Area M2;
3. Southern California Edison, LA DWP and San Diego Gas and Electric, designated Area M3; and
4. Arizona and New Mexico, designated Area M4.

Areas M1 and M4 typically oscillate with respect to Area 3, depending on the fault, post fault system condition, or the location and severity of the system disturbance. The Pacific Northwest swings at about 0.3 Hz and Arizona-New Mexico swings at about 0.7 Hz with respect to California. Generally when system swings occur, they are multimodal and both the modes can be observed simultaneously in the Southern California area.

The oscillations are generally well damped. The damping level, however, depends on the power transfer levels on various transmission paths. The damping usually takes a few (10–15) seconds. However, if the power transfer levels are high, the oscillation amplitudes either continue to grow or remain undamped and can result in a break up of the system by tripping of the transmission lines. Under normal system operation conditions, these oscillation modes, although present, are of very small magnitude (−60 to −80 dB) and are fully damped. However, a fault in the system, a large generator trip or a major load drop or line outage can excite these oscillation modes with large power movements from one area to the other.

Power system stabilizers are known, having a primary purpose of providing damping on the system to counteract the undamping resulting from the use of modern fast acting excitation systems. The stabilizers, which are applied on the excitation system of generating machines, were initially used for damping the oscillations of an individual machine with respect to the rest of the system, otherwise known as local mode oscillations (2.0–4.0 Hz). A power system stabilizer basically modulates the machine voltage to control the voltage oscillations through the generator exciter by extracting low frequency rotor oscillations from a speed signal. Because the power system stabilizers of the prior art act through the excitation system, they can only control the reactive power output of the generators, there being little if any control of the real power output. Thus the stabilizers of the prior art typically feed exciters with control signals that are derived from measurements of reactive power. The real power in a generator is primarily controlled by a governor of the machine, the governor incorporating integral compensation for imparting control stability thereto.

There have been attempts to stabilize power system oscillations over the last 25 plus years, using the power system stabilizers feeding machine excitation systems as described above. The signal injected by the power system stabilizer in the excitation system results in change of the voltage at the generation machine terminals. This change in voltage also results in some slight change on the machine power output. This concept modulates the machine's reactive power output mostly. A small degree of real power control is, however, achieved through the change in the terminal voltage caused by the excitation system. If this machine output change happens to be in opposition to the oscillations that are occurring in the system, then the power system stabilizer is able to stabilizer the system power oscillators. However, this approach is ineffective when, as often happens, the machine output is not in opposition to the oscillations.

There have also been attempts to control power generators by injecting signals into the machine governor loops in order to alter the machine power output. A frequency deviation error signal for this purpose can be derived from monitored frequency or power signals of the system. These attempts have been unsuccessful because the governors of the generators that were the subject of the past attempts were generally slow. Also, the attempts were directed to oscillation frequencies of mostly local mode oscillations, being in the range of 1.0 to 3.0 Hz.

Thus there is a need for improved methods and circuitry for compensating against inter-area or regional oscillations of a power distribution network for permitting greater utilization of the available generating capacity.

SUMMARY

The present invention meets this need by providing real power compensation of power delivery elements of the system, at frequencies that are effective for damping inter-area oscillations associated with power transfers that can occur in response to local system failures. In one aspect of the invention, an electrical power distribution system having geographically separated plural generation stations and geographically separated loads is improved with means for monitoring deviations in frequency and/or phase of alternating current power on a network of transmission lines between the stations and the loads; and means for dynamically offsetting a nominal real power operating point of a main control system driving a power control element that variably feeds electrical power onto the network.

The power control element is typically in a power path of one of the generation stations, which can further include an AC generator operatively connected to the power source and having an exciter input, a power system stabilizer being operatively connected to the exciter input for controlling and stabilizing reactive power of the generator. The generation station can include an actuator control circuit for driving the control element in response to a power setting signal, the actuator control circuit incorporating a delay component, wherein the means for offsetting includes an offset signal connection downstream of the actuator control circuit for bypassing the delay component. The monitoring means can include a transducer for measuring rotational speed of the generator, a transducer for measuring output phase deviations of the generator, and/or phasor data means for measuring output real power and reactive power of the generator, wherein the power system stabilizer is responsive to the measured reactive power and the means for dynamically offsetting is responsive to the measured real power output. The phasor data means can be connected to the network at a location geographically local to the AC generator, or at a plurality of geographically spaced locations, in which case the system includes a circuit for signaling differences in the measured phasor data from the spaced locations.

The AC generator can be a steam turbine generator, the power path being a steam conduit to the generator, the power control element being a valve for variably restricting the steam conduit. Preferably, when the system includes a governor circuit for driving the valve in response to a power set point and having an integrator element for stabilizing the steam turbine generator by imparting a dynamic lag function (delay), the means for dynamically offsetting the operating point is connected downstream of the integrator element for bypassing the lag function. The valve can be at least one in a subset of control valves that are responsive to a respective opening signals that produce the nominal power setting, the at least one valve of the subset being additionally responsive to the monitoring means.

The AC generator can be a gas turbine generator, the power path being a fuel conduit to the generator, the power control element being a valve for variably feeding the fuel. The valve can be one of a plurality of fuel control valves, each of the control valves being responsive to a respective opening signal that is responsive to a respective nominal power setting, the valve of the power control element being additionally responsive to the monitoring means. The monitoring means can include a transducer for measuring a power output frequency of the one generation station.

The monitoring means can include a transducer for measuring an AC line frequency proximate the power control element. The transducer can be a local transducer, the monitoring means further including a remote transducer for measuring an AC line frequency at a geographically distant location of the network, and means for signaling a difference between the measured frequencies.

Preferably the system further includes means for monitoring a threshold level of the deviations, and means for inhibiting the means for dynamically offsetting until the deviations exceed the threshold level. Thus the real power compensation is applied selectively under high levels of power transfer between geographically distant locations, when the system has a dominant characteristic frequency of oscillation that is lower than an ordinarily dominant local characteristic frequency of the system. The threshold level can be at least approximately 0.03 Hz. The first characteristic frequency can be greater than 1.4 Hz, the second characteristic frequency being less than 1.4 Hz.

In another variation that is preferred when the system is subject to different modes and frequencies of inter-area oscillation, depending on the occurrence of large power transfer between different geographically distant locations, the means for dynamically offsetting includes parallel signal paths having different frequency bandwidths for separately compensating the different inter-area oscillations. The means for dynamically offsetting can have a range being not more than approximately plus to minus six percent of a full scale real power operating point of the power control element.

In another aspect of the invention, a method for improving stability of the power distribution system includes the steps of:
  (a) monitoring deviations in at least one of frequency or phase of the alternating current power; and
  (b) dynamically offsetting the real power operating point in correspondence with the monitored deviations.

When the system has the different characteristic frequencies under normal loading and under high levels of power transfer between geographically distant locations, the method preferably includes the further steps of:
  (a) setting a threshold level of the monitored deviations; and
  (b) inhibiting the step of dynamically offsetting until the deviations exceed the threshold level.

The inhibiting step can be terminated when the threshold level exceeds approximately 0.03 Hz. When the power control element includes the plurality of steam generator control valves, the step of dynamically offsetting preferably includes offsetting the opening signal of at least one of the valves. Preferably, when the valve has a relatively high gain transfer characteristic in a medial valve opening region, the method includes the further steps of:
  (a) comparing an operating range of the at least one valve with a desired operating range being the medial valve opening region; and
  (b) adjusting a nominal setting of the at least one valve for centering the operating range thereof relative to the medial valve opening region.

The step of offsetting the opening signal can include scaling a dynamic range of the offsetting to between approximately 2.5% and approximately 5% of a maximum power output of the steam power generator. The step of monitoring can include measuring frequency changes within a bandwidth of from approximately 0.2 Hz to approximately 1.0 Hz. The step of measuring can be of frequencies geographically local to the power control element. The step of measuring can be of frequencies at a plurality of geographically spaced locations, the method including the further step of comparing the geographically spaced measurements.

The step of monitoring can include the steps of:
(a) maintaining phasor data defining orthogonal real power and reactive vectors associated with the network geographically local to the power control element; and
(b) determining deviations in phase of the real power vector.

The phasor data can be from a location on the network geographically local to the power control element. The phasor data can be from a plurality of geographically spaced locations on the network, the method including the further step of comparing the geographically spaced measurements. The network can be a three-phase network, the step of monitoring including the further steps of:
(a) maintaining a positive sequence vector defining a composite voltage phase and magnitude of the network; and
(b) extracting the voltage phase from the vector.

In a further aspect of the invention, a method for improving stability of a power distribution system includes the steps of:
(a) monitoring deviations in real power within a frequency bandwidth of between approximately 0.2 Hz and approximately 1.0 Hz; and
(b) dynamically offsetting the real power operating point in correspondence with the monitored deviations.

The step of monitoring can include the steps of:
(a) maintaining phasor data defining orthogonal real power and reactive vectors associated with the network; and
(b) extracting a real power component of the phasor data.

Alternatively, or in addition, the step of monitoring can include the steps of:
(a) maintaining a positive sequence vector defining a composite voltage phase and magnitude of the network; and
(b) extracting the voltage magnitude from the vector.

DRAWINGS

These and other features, aspects, and advantages of the present invention will become better understood with reference to the following description, appended claims, and accompanying drawings, where:

DESCRIPTION

Figure 1:
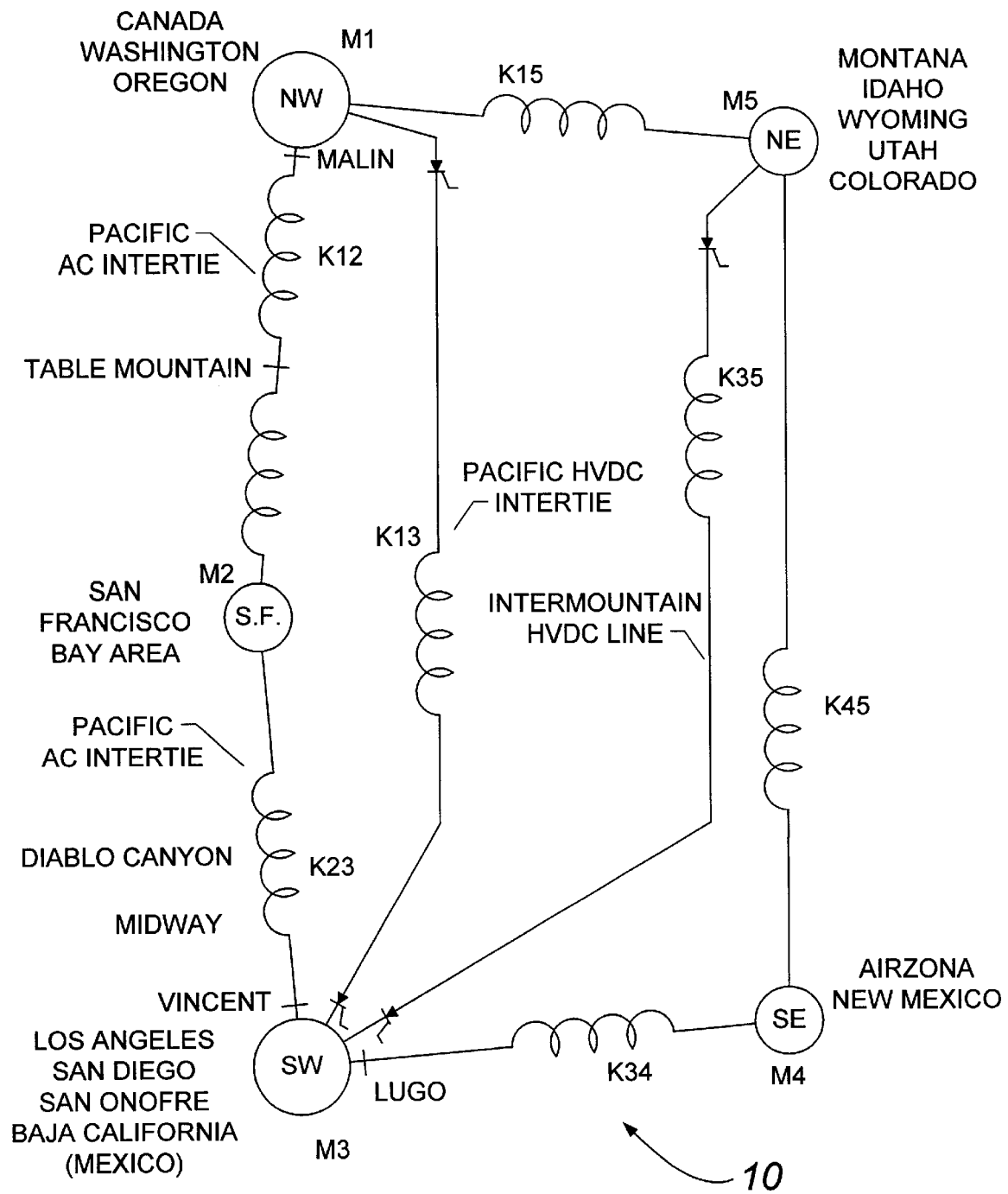
FIG. 1 is a pictorial diagram of an existing regional power distribution network.
Figure 2:
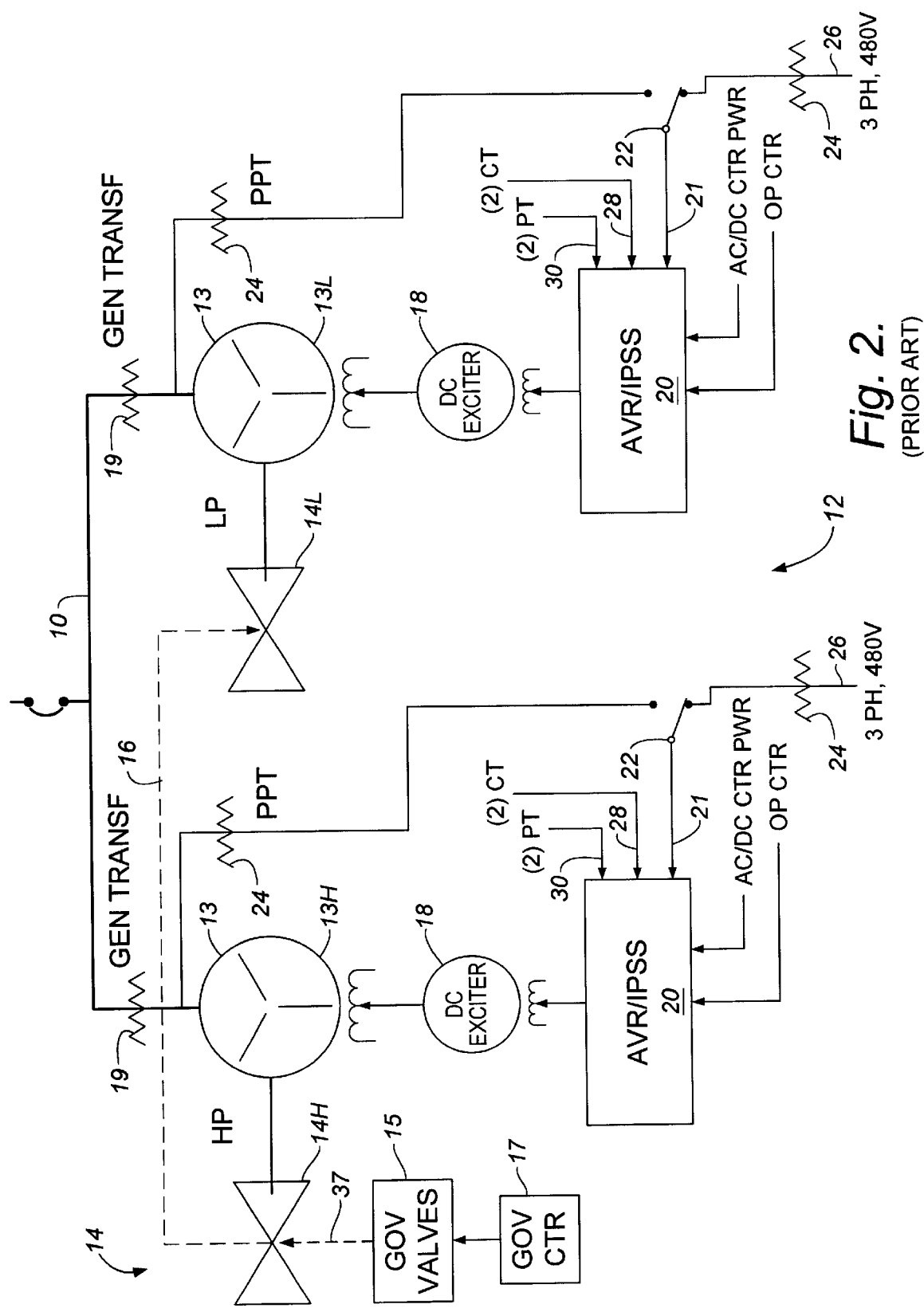
FIG. 2 is a block diagram of a prior art power generator of the network of FIG. 1.

The present invention is directed to an improved power distribution system that is particularly effective in a variety of operating conditions that include high levels of power transfer between geographically distant areas. With reference to FIGS. 1 and 2 of the drawings, an existing power distribution network 10 includes a plurality of transmission lines or paths that extend between several geographically separated areas, designated M1 (North West), M2 (San Francisco), M3 (South West), M4 (South East), and M5 (North East). The transmission paths (Knm) have designations corresponding to the connected areas; for example, the path connecting area M2 to area M3 is designated K23. An important characteristic of this and other existing power distribution networks is that there are multiple transmission paths between at least some of the areas. For example, the areas M2 and M3 are connected by the parallel combinations of K12 in series with K13; K12 in series with K15 and K35; and K12 in series with K15, K45, and K34; with K23.

Within each of the areas, there is typically at least one power generating station. FIG. 2 diagrams a conventional two-stage steam power plant 12 having a two-stage pair of rotating machine A.C. generators 13 (a first generator 13H and a second generator 13L) being separately shaft-connected to respective steam turbines 14 (a high pressure turbine 14H and a low pressure turbine 14L), a governor valve unit 15 controlling steam flow to the high pressure turbine 14H, a conduit 16 passing exhaust steam from the turbine 14H for feeding the low pressure turbine 14L. Typically, the valve unit 15 includes a plurality of valves that are individually controlled by separate circuits of a governor controller 17 as further described below in connection with FIGS. 3 and 4. Each of the generators 13 has a D.C. exciter 18 associated therewith, and is connected for feeding the network 10 by a respective generator transformer 19. The governor valve unit 15 is fed high-pressure steam from a conventional boiler (not shown).

In the existing power plant 12, each of the exciters 18 is responsive to a respective power system stabilizer (PSS) 20 for controlling reactive power of each generator 13. Each PSS 20 has a transducer signal input 21 being connected by a selector switch 22 selectively through respective potential transformers 24 to the output of the associated generator 13 for sensing the output voltage thereof, or to a source 26 of reduced voltage (3-φ, 480V). Additional (unused) transducer signal inputs of the PSS 20 include a pair of current transformer inputs 28 and a pair of potential transformer inputs 30, the PSS 20 also having an AC/DC control power buss 32, and an operator control buss 34. Accordingly, the stabilizers 20 of the power plant 12 are operative for damping oscillations in the reactive power of the generators 13 by selectively sensing the output voltage of the corresponding generator 13 or sensing a low voltage node of the network 10 using the selector switch, and/or by sensing other available voltages or currents. Other suitable sources of transducer signals include shaft tachometers and pulse generators rotatively coupled to the generators 13. Typically the network 10 is configured for three-phase operation, and each of the generators 13 is a three-phase device. Thus the potential transformers 24 and any current transformers being used are typically three-phase devices, having separate outputs for each of the phases. Accordingly, each of the inputs 21, 28 and 30 has separate channels for the respective phases.

In accordance with the present invention, and with further reference to FIGS. 3–6, an improved steam power plant, designated 12', incorporates a counterpart of the power system stabilizer, designated integrated power system stabilizer (IPSS) 20', other elements having like designations being configured as described in connection with FIG. 2. The IPSS 20' is adapted for dynamically offsetting one or more valves of the governor valve unit 15 to compensate against low frequency oscillations in the real power of the generator 13 while bypassing stability compensation circuitry of the governor controller 17 that would otherwise interfere with desired dynamic offsetting. More particularly, the connection of the exciter 18 to the IPSS 20' is designated reactive control signal 32, the IPSS 20' also feeding a real control signal 34 to the valve unit 15. The designation of the reactive control signal 32 is reflective of the fact that modulation of the signal to the exciter 18 produces corresponding modulation of the reactive power output of the generator, but little if any modulation of the real power output. Further, the IPSS 20' is configured for driving the reactive control signal 32 in response to sensed variations in reactive power, as discussed above in connection with the stabilizer 20 of FIG. 2. In contrast, the real control signal 34 is effective for modulating the real power output of the generator 13 in that the governor valve unit 15 directly affects the power produced by the turbines 14 by throttling steam flow thereto. Similarly, the IPSS 20' is configured for driving the real control signal 34 in response to sensed variations in real power. It will be understood that the real power compensation provided by the IPSS 20' can be implemented by a standalone unit that drives the real control signal 34 in the same manner as described herein for the IPSS 20', the PSS 20 separately providing the reactive stabilization of the generator 13H as described above.

Optionally, the IPSS 20' on the high pressure side (for the high pressure generator 13H) has a large signal cutoff output 35 for inhibiting operation of the other (low pressure) PSS 20 in the event of saturation or other abnormal condition. [Is this correct? What really happens?].

Figure 4:
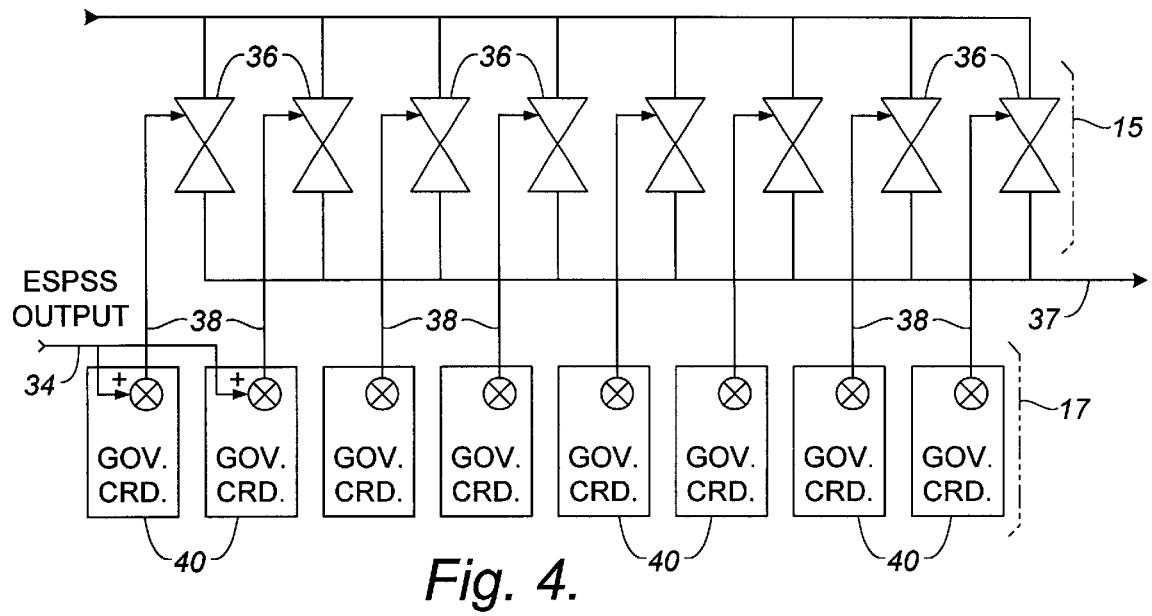
FIG. 4 is a block diagram of a governor valve portion of the power generator of FIG. 3.
Figure 5:
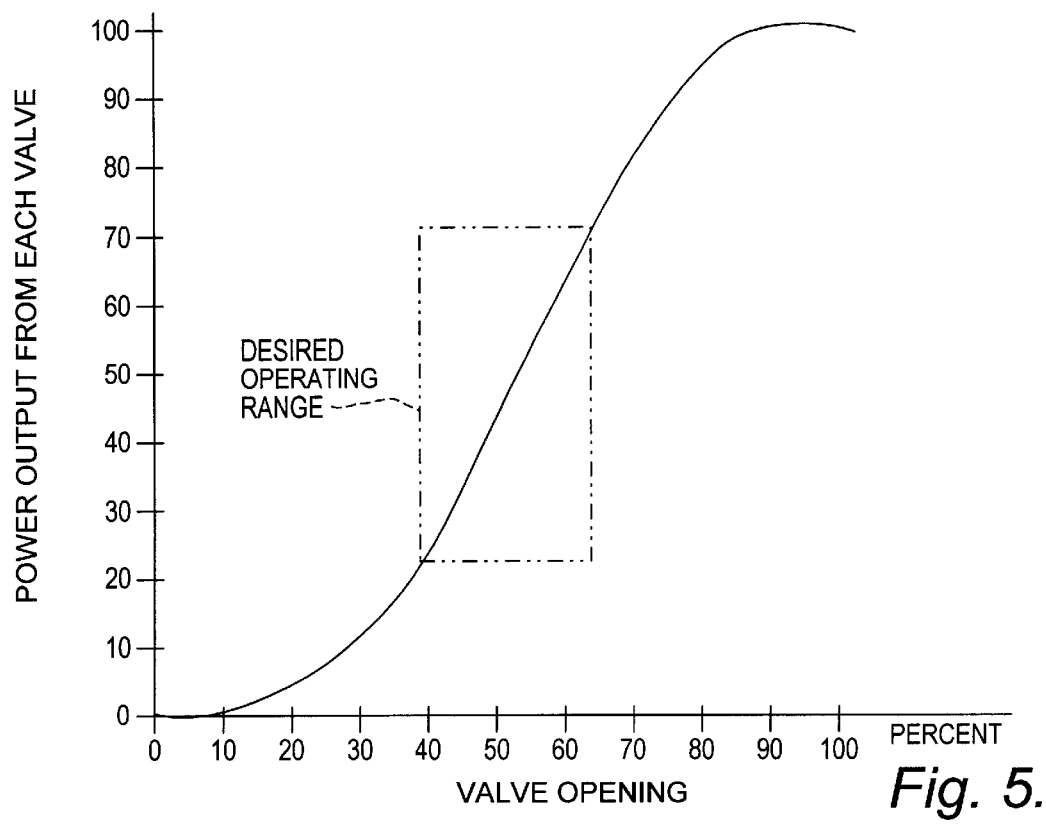
FIG. 5 is a graph of a transfer characteristic of a governor valve of the power generator of FIG. 4.

As shown in FIG. 4, an exemplary configuration of the governor valve unit 15 includes eight control valves 36 being parallel-fluid-connected in a main steam supply conduit 37 that feeds the high pressure turbine 14 H. Each control valve 36 is responsive to a conventional 4–20 ma drive signal 38 from a corresponding governor card 40 of the governor controller 17. The real control signal 34 is connected for offsetting the drive signal 38 of one or more of the governor cards 40, preferably a subset of the cards for enabling limited control only of the steam flow to the turbine 14 under full-scale excursions of the real control signal 34. FIG. 4 shows the real control signal 34 being connected at two of the cards 40 for offsetting control of two out of the eight control valves 36. It has been determined that a suitable range of the dynamic offsetting is from about 2 percent to about 6 percent of the maximum power output of each generator 13. Also, the control valves 36 exhibit a decidedly non-linear gain characteristic in nearly closed and nearly open positions, a central operating region having maximum and nearly constant gain and being therefore preferred. By scaling the full-scale range of the real control signal 34 to approximately the central 25 percent of the full scale range of the drive signals 38, a dynamically offset control valve 36 can be responsive to modulate the overall power output of the plant 12' being contributed by that valve 36 to approximately 50 percent of the maximum power output attributable to that valve, as shown in FIG. 5. Thus in the exemplary case of eight control valves 36, dynamically offsetting one of the valves as described above correspondingly offsets the overall power output approximately 6 percent, or ±3 percent. Correspondingly, offsetting two of the eight valves 36 as shown in FIG. 4 provides dynamic control of the real power up to approximately ±6 percent of the maximum output.

Figure 6:
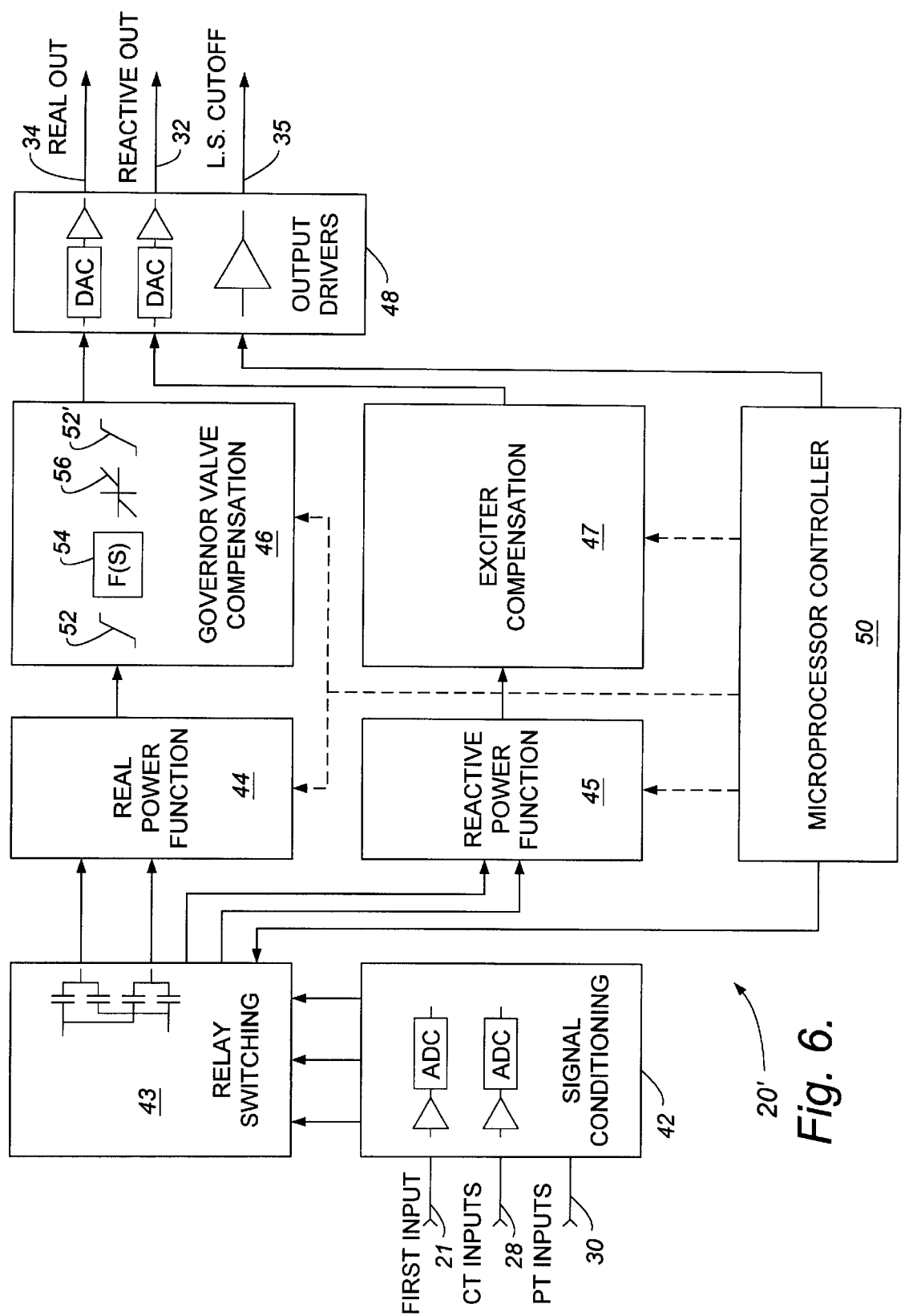
FIG. 6 is a simplified functional block diagram of the network system stabilizer of FIG. 3.

As shown in FIG. 6, an exemplary configuration of the system stabilizer 20' includes a signal conditioner 42 for receiving, filtering, and converting the inputs 21, 28, and 30, a switching array 43, respective real and reactive power function generators 44 and 45, respective governor valve and exciter compensators 46 and 47, an output driver 48, and a microprocessor controller 50. Other features of the stabilizer 20' include operator controls (local and remote), displays and activation logic (not shown), being conventional features of the existing PSS 20 of FIG. 2. A power system controller suitable for use implementing the IPSS 20' of FIG. 6 is available as Model ST2000, from General Electric Co. of Schenectady, N.Y. The function generators 44 and 45, and the compensators 46 and 47 are software-configured and operated digital elements that exist in memory of the microprocessor controller 50. Accordingly, the signal conditioner 42 incorporates analog to digital conversion, producing multiple-bit outputs and/or variable frequency pulse-train outputs. Multiple bit outputs are conventionally produced by feeding an analog signal to an analog-to-digital converter (ADC). Typically, however, it is more expedient to derive a needed function from a single-bit pulse train. For example, a digital counterpart of the signal at the potential transformer input is obtained by feeding the signal to a voltage-controlled oscillator (VCO), the VCO output being a single-bit pulse train having a frequency proportional to the input voltage, the frequency being determinable by counting the pulses over a fixed time interval. Similarly, the frequency of an AC input is directly determinable by counting cycles of the input over a fixed interval.

The switching array 43 includes a plurality of relay switches that are selectively activated by the controller 50 for routing appropriate ones of the conditioned input signals from the conditioner 42 to respective inputs of the function generators 44 and 45. The reactive function generator 45 and the exciter compensator 47 are contemplated to be implemented in a conventional manner, as in the system stabilizer 20 of FIG. 3. For example, the reactive function generator 45 can be implemented for calculating phasor data associated with the generator 13, from which the reactive power component is fed to the exciter compensator 47. The exciter compensator 47 includes a digitally implemented dynamic transfer function, and can include further elements that are further described below in connection with the governor valve compensator 46.

The real function generator 44 can be implemented as a (shared) counterpart generating the generator phasor data, but feeding the real power component to the governor valve compensator. Alternatively, the generator 44 can be configured for extracting a precise line frequency or phase deviation of the network. In a further alternative, the function generator 44 can compute a positive sequence vector of the form, The above positive sequence vector includes both phase and magnitude information. In contrast, RMS voltage data contains no phase information. The terms Va, Vb, and Vc denote the respective three phase voltages, and alpha (α) denotes a rotation of 120°.

The governor valve compensator 46 can incorporate a cascaded combination of functional elements. As shown in FIG. 6, an exemplary configuration of the compensator 46 includes a clipping function 52, followed by a linear transfer function (F(s)) 54, a deadband function 56, and a counterpart of the clipping function, designated 52'. The transfer function 54 is configured for damping frequencies primarily in the range of approximately 0.2 Hz to approximately 1.4 Hz, or in appropriate cases, from approximately 0.25 Hz to approximately 0.8 Hz. Typically, the transfer function includes a low pass term (1/(1+sTlp)) for filtering hum and noise and one or more lead lag terms ((1+sT1)/(1+sT2)) for compensating against low frequency oscillations at frequencies associated with potential instabilities that have been encountered when large magnitudes of power are required to be transferred between widely geographically separated locations of the network 10. In the IPSS 20' as implemented herein, the controller 50 is programmed to cycle the various functional elements at 90 Hz.

Preferably the microprocessor 50 is implemented for suppressing operation of the governor valve compensator 46 unless and until sensed oscillations reach a threshold magnitude, so that the governor controller, in combination with the exciter compensation by the reactive control signal 32 can be optimized for local system dynamics, the real control signal 34 being operative when lower frequency inter-area oscillations are encountered.

The output driver 48 includes a conventional digital to analog converter and line driver for each of the compensators 46 and 47, thereby to produce the respective reactive and real control outputs 32 and 34. The driver 48 also optionally includes a digital line driver for feeding the large signal cutoff output 35 in response to the microprocessor controller 50.

The IPSS 20' of the present invention differs from conventional power system stabilizers by regulating the real power output of the power plant 12 within a range of low frequencies (from less than approximately 0.2 Hz up to approximately 1.4 Hz) at which regional instability is known to be a potential cause of system failure. Based on preliminary testing, it has been discovered that the control valves 36 of modern steam power plants are sufficiently fast-acting to preserve local system stability when a subset of the valves is responding to the real control signal being additively combined with the output of the associated governor cards. With the IPSS 20' applied to a large power source (on the order of 100 megawatts (MW)), it is believed possible to damp the regional oscillations even with a small change (5 percent) in the generator output. Alternatively, a counterpart of the real control signal 32 can be additively combined at the input of the governor controller 17 of smaller power plants having faster overall response characteristics, it being understood that it is preferred to apply the real power compensation of the present invention to a significant proportion of the overall generating capacity within a particular region of the network 10.

Figure 7:
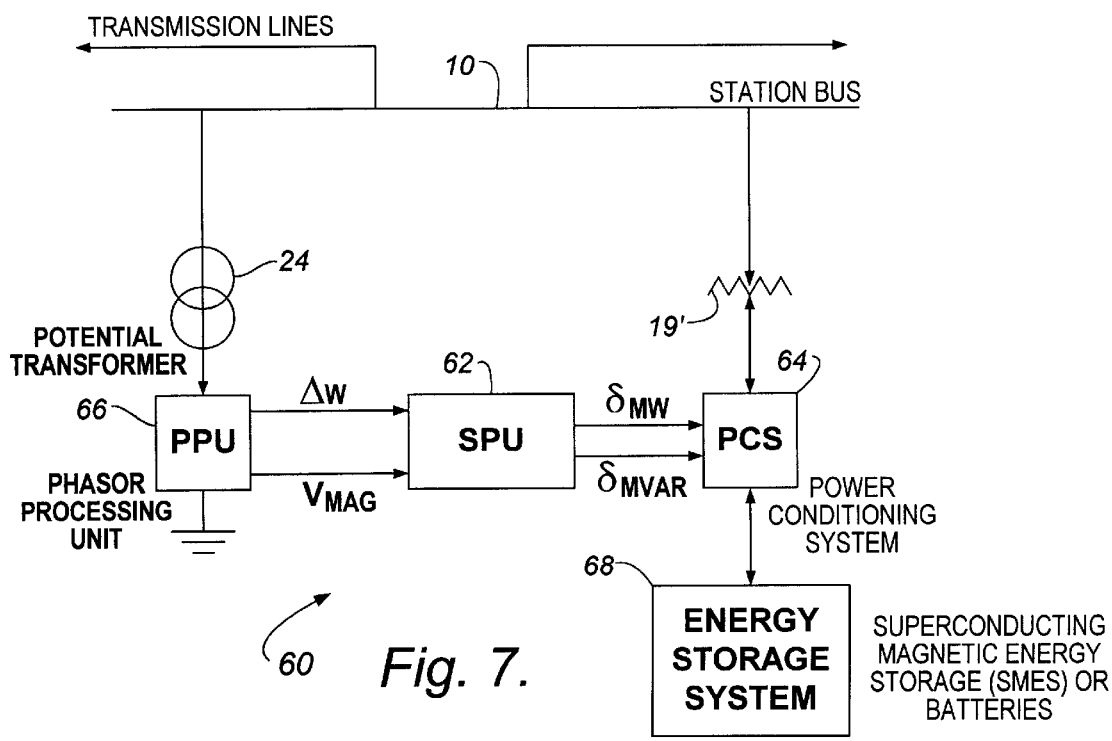
FIG. 7 is a block diagram showing another alternative configuration of the system stabilizer of FIG. 3 as applied to an energy storage plant of the network of FIG. 1.

With further reference to FIG. 7, an energy storage plant 60 of the power distribution network 10 includes a counterpart of the power system stabilizer 20', designated signal processing unit (SPU) 62. The SPU 62 drives a power conditioning system (PCS) 64 in response to a phasor processing unit (PPU) 66. The PCS 64, which is connected to the network 10 by a counterpart of the generator transformer, designated 19', provides a bidirectional interface between AC and DC power nodes for feeding and extracting power relative to an energy storage system (ESS) 68. The ESS 68 is used for storing surplus power during off-peak hours and augmenting network power during periods of peak demand, and can be implemented as a battery system, a superconducting magnetic energy storage system (SMES), or analogous system. The SPU 62, as a functional counterpart of the IPSS 20', can be applied on the battery or super conducting energy storage system by controlling the PCS 64, which in the case of a battery system converts AC to DC power and vice versa, and controls battery power input or output. The PCS 64, using known circuitry of the prior art, has the capability accept both the MVAR (reactive) and the MW (real) power orders. However, in typical applications, the SPU 62 may be implemented to provide the MW output only. In the exemplary implementation of FIG. 7, the PPU 66 produces a frequency deviation signal Δω and a voltage magnitude signal VMAG in response to a counterpart of the potential transformer 24. The signals Δω and VMAG are processed by the signal processing unit 62 to generate respective δMW and δMVAR signals for controllably driving the PCS 64. Thus the PPU 66 provides an external counterpart of the real and reactive function generators 44 and 45 of the power system stabilizer 20' of FIG. 6. In the case of the ESS 68 being a battery system, the SPU 62 can process the frequency deviation signal Δω to control the Megawatt output or input of the batteries at frequencies including the low frequencies associated with the potentially harmful regional oscillations discussed above. The combination of the SPU 62 and the PCS 64, which can regulate the real power output to counteract these oscillations, is able to damp the oscillations more effectively than systems that can regulate only the reactive power within the corresponding frequency range.

Figure 8:
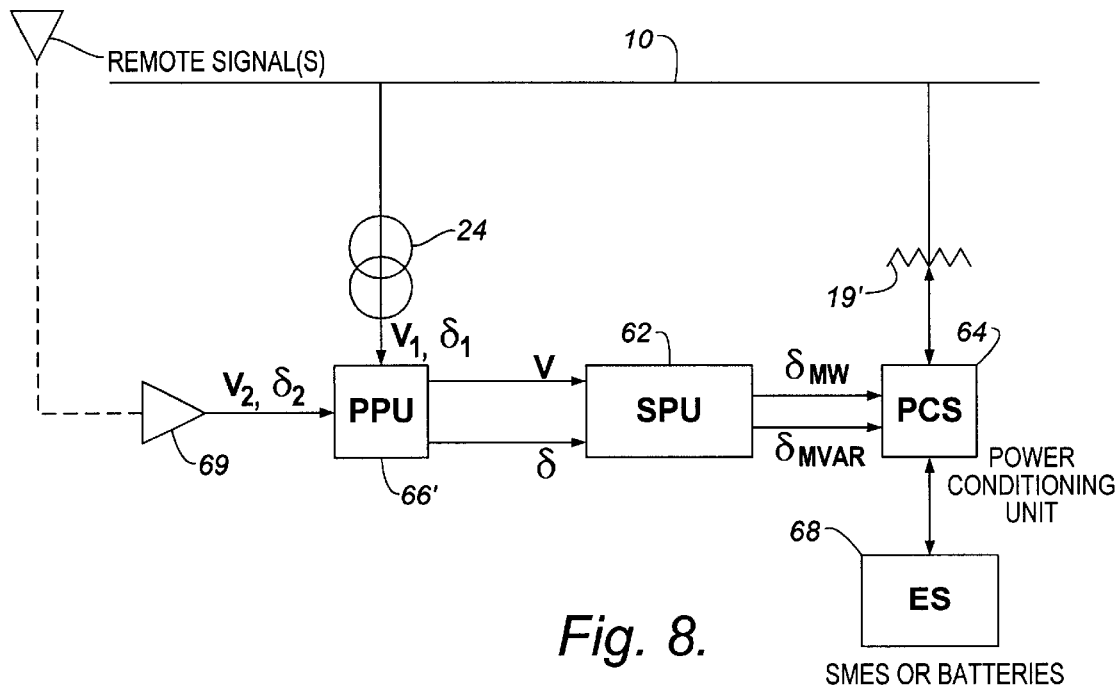
FIG. 8 is a block diagram showing an alternative configuration of the energy storage plant of FIG. 7.

With further reference to FIG. 8, an alternative configuration of the energy storage plant 60 includes a remote signal receiver 69 for feeding remotely sensed signals to a counterpart of the phasor processing unit 66. In the configuration of FIG. 8, the potential transformer 24 signals a first voltage V1 and a first phase δ1 to the phasor processing unit counterpart, designated PPU 66', and the receiver 69 signals corresponding second voltage and phase V2 and δ2, the PPU 66' computing and feeding respective difference signals V and δ to the SPU 62. Thus the SPU 62 feeds the δMW signal being proportional to δ=δ1−δ2 (or Δω=Δω1−Δω2), and the δMVAR signal being proportional to ΔV=ΔV1−ΔV2. This configuration wherein the network 10 is stabilized using remotely sensed signals is advantageous in that such signals lead or anticipate the propagation of oscillations on the network itself. Thus the use of remote sensing is believed to improve the effectiveness of the SPU 62 in stabilizing the network 10 against regional oscillations. It will be understood that the remote sensing provided by the remote signal receiver 69 is also preferred in the steam power plant 12' of FIG. 3, the receiver 69 being connected for feeding the signal input 21 or a counterpart thereof to the IPSS 20'. Further, separate gain factors can be applied to the locally and remotely sensed signals for weighting the compensation relative to respective local and remote network oscillations. Moreover, the PPU 66' in combination with a front portion of the SPU 62 serves as a counterpart of the IPSS 20' of FIG. 6.

Figure 9:
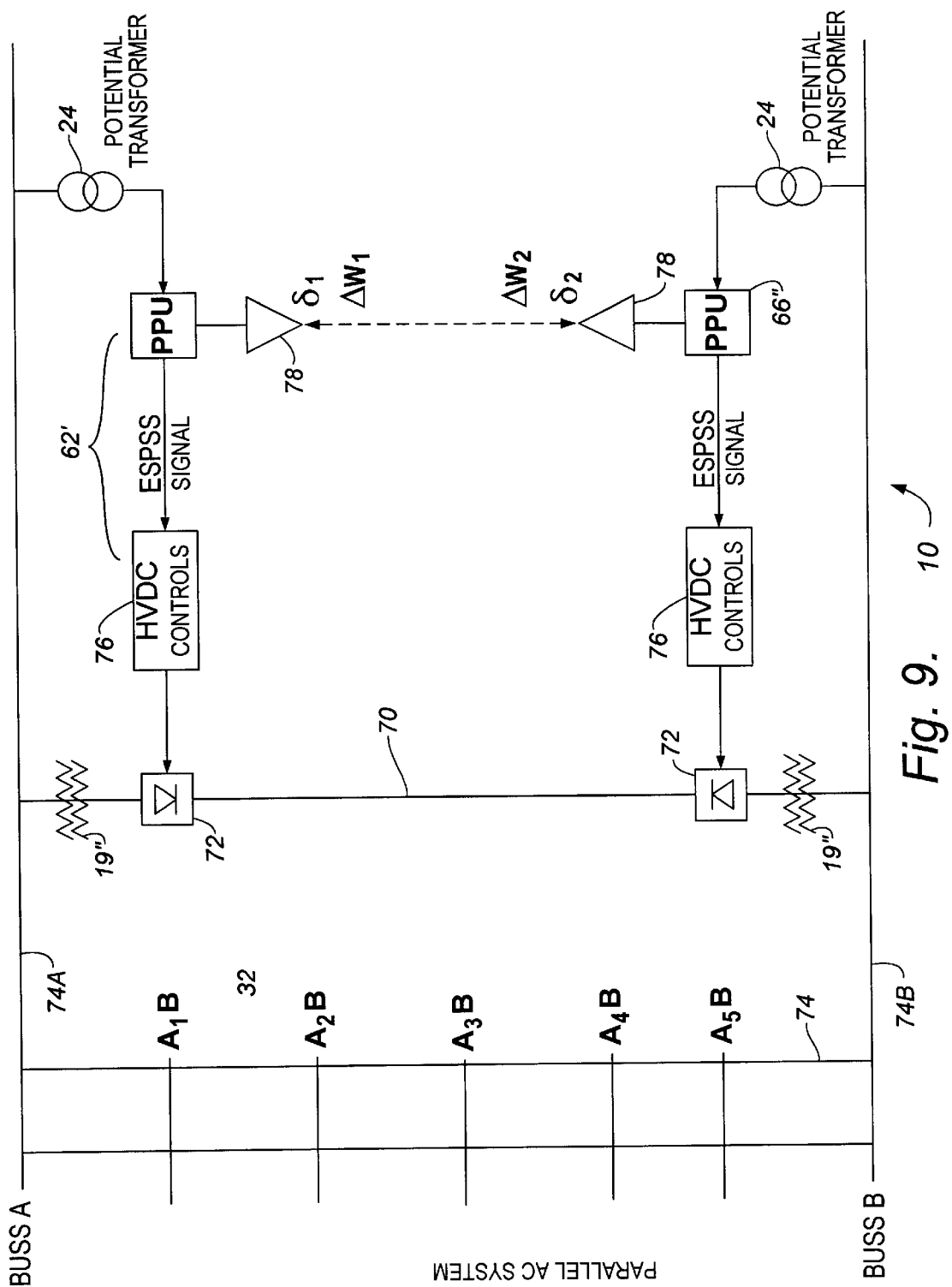
FIG. 9 is a pictorial block diagram showing a pair of system stabilizers as in FIG. 8 as applied to a high-voltage DC line portion of the network of FIG. 1.

With further reference to FIG. 9, a another application of the signal processing unit 62 is at terminals of a high voltage direct current (HVDC) transmission line 70, such as the line designated K13 in the network 10 of FIG. 1. The HVDC line 70 is terminated by counterparts of the power conditioning system 64 of FIGS. 7 and 8, designated control driver 72. As shown in FIG. 9, each driver 72 is interfaced to a respective AC buss 74 of the network 10 (buss A being designated 74A and buss B being designated 74B) by corresponding counterparts of the transformer 19', designated 19", a parallel path of the network 10 being schematically represented by series-connected AC nodes A1B, A2B, A3B, A4B, and A5B. Each of the drivers 72 is locally driven by a HVDC control unit 76 in response to another counterpart of the phasor processing unit, designated PPU 66". The PPUs 66" are remotely cross-coupled by respective signal transceivers 78 for stabilizing the network 10 against regional low-frequency oscillations by controlling each of the drivers 72 using geographically remote sensing of phase, voltage and/or current deviations on the network. A counterpart of the signal processing unit, designated SPU 62' is thus resident in each HVDC control unit 76, the corresponding phasor processing unit 66", or partially in each. It will be understood that the cross-coupling of remotely sensed network conditions as described herein is applicable to the steam power plant 12' of FIG. 3, the energy storage plants 60 of FIGS. 7 and 8 as well as the HVDC line 70 of FIG. 9, and any combination thereof that is included in the power distribution network 10.

Figure 3:
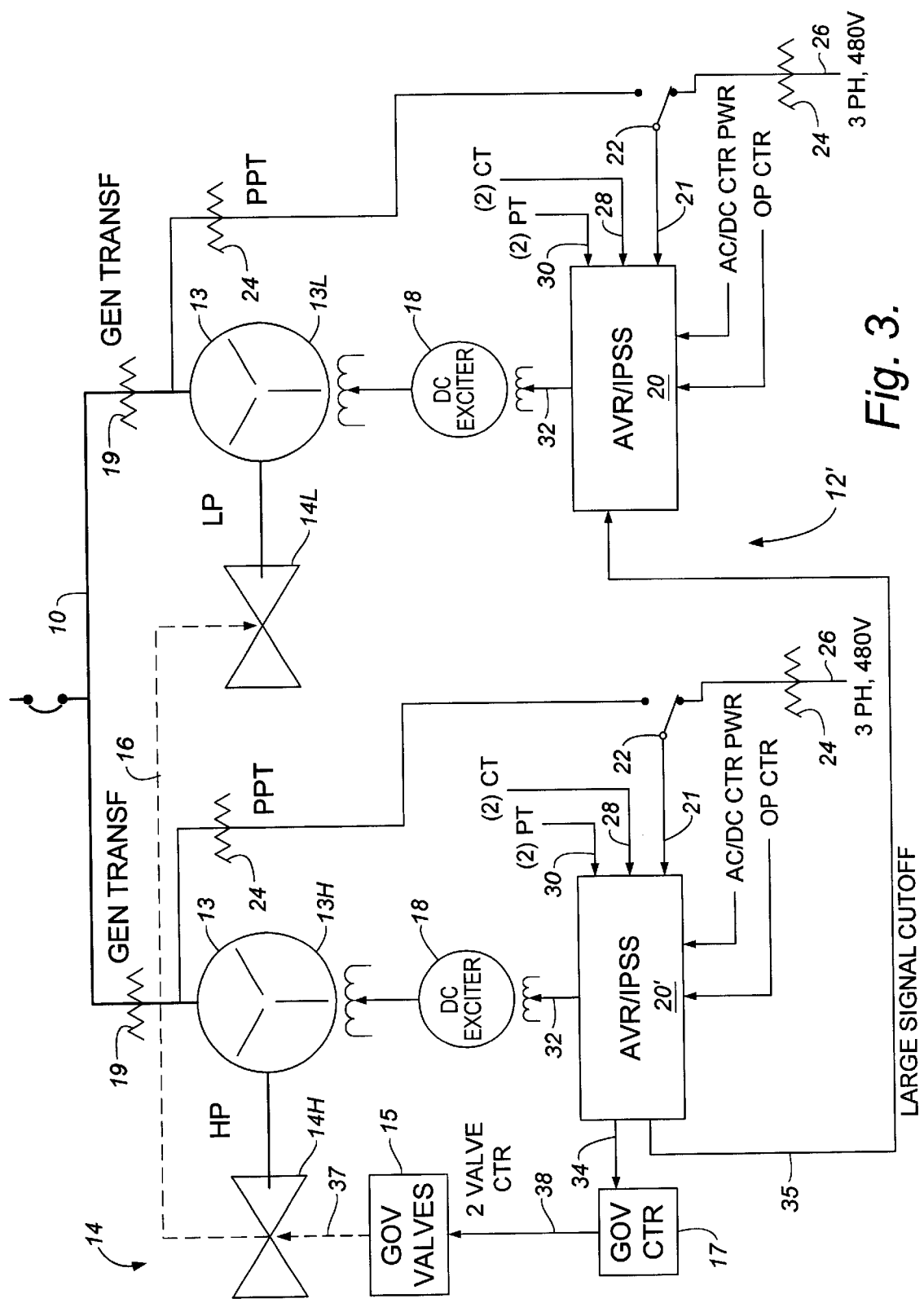
FIG. 3 is a block diagram as in FIG. 2, showing a steam power generator incorporating a network system stabilizer according to the present invention.
Figure 10:
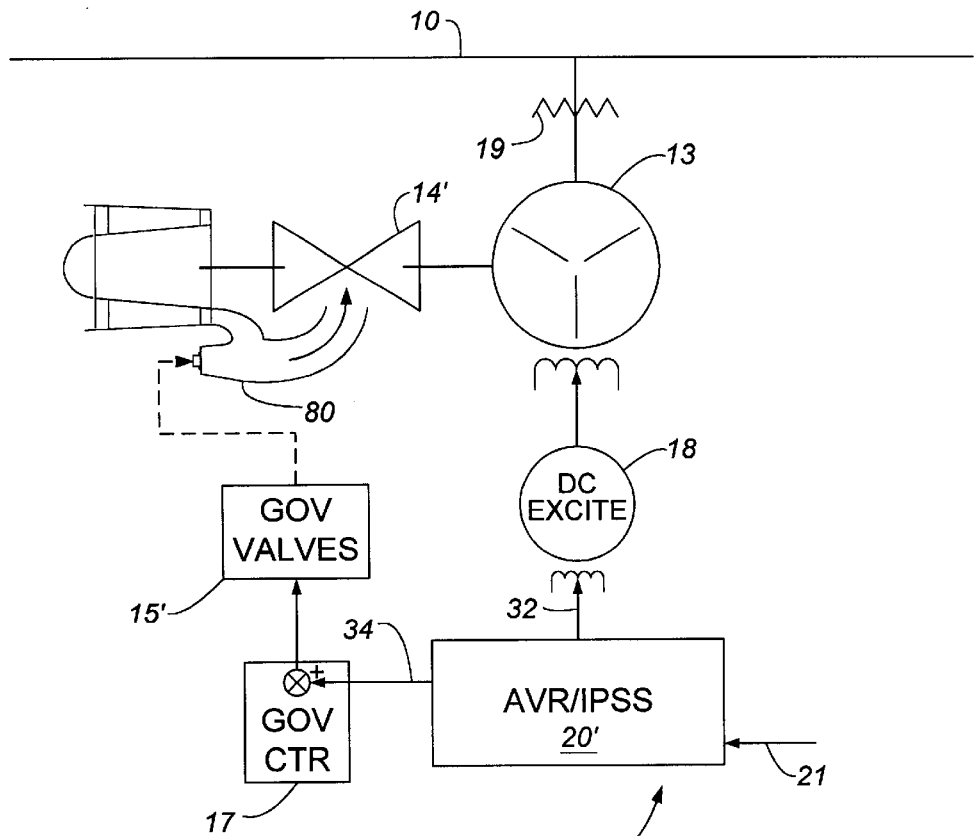
FIG. 10 is a block diagram showing an alternative configuration of the system stabilizer of FIG. 3 in a gas turbine power generator.

With further reference to FIG. 10, a yet further application of the present invention is to a gas-turbine counterpart of the steam power plant of FIG. 3, designated 12". The gas turbine power plant 12" includes a counterpart of the generator machine 13 being shaft-connected to a gas turbine 14' having a combustor 80, a counterpart of the governor valve unit, designated fuel valve unit 15' variably feeding fuel to the combustor 80. A counterpart of the power system stabilizer 20' is connected to counterparts of the governor controller 17 and the D.C. exciter 18 as described above for respectively controlling real and reactive power output of the power plant 12".

Figure 11:
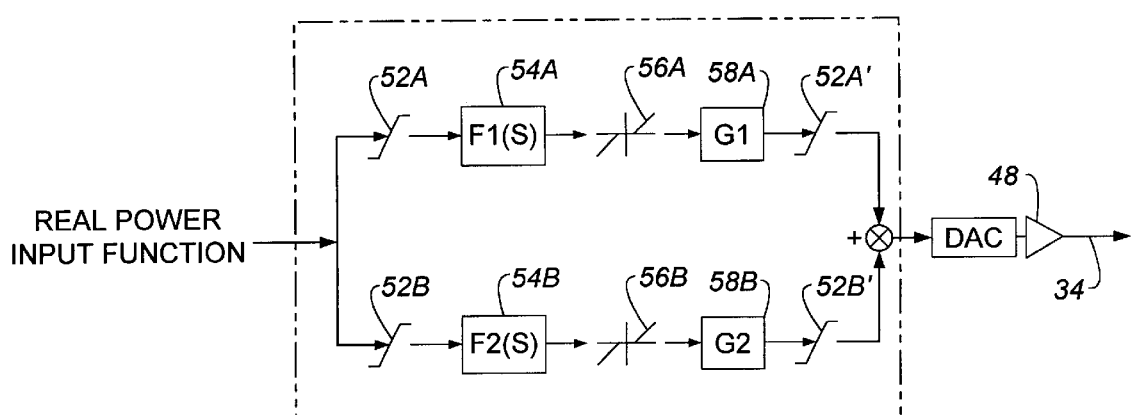
FIG. 11 is a block diagram showing an alternative configuration of a portion of the network system stabilizer of FIG. 6.

With further reference to FIG. 11, an alternative configuration of the real function generator 46 includes separate transfer paths for compensating different characteristic frequencies of inter-area system oscillation that can occur when large power transfers are called for between one location on the network 10 and more than one geographically distant location. As shown in FIG. 11, the signal from the real function generator 44 branches to separate counterparts of the clipping function, designated first clipping function 52A and second clipping function 52B. The signal paths proceed from the clipping functions 52 to respective cascaded first and second counterparts of the transfer function (54A and 54B), the deadband function (56A and 56B), and another clipping function (52A' and 52B'), respective first and second gain functions 58A and 58B being interposed between the deadband functions 56 and the clipping functions 52', from which the signals are additively combined before being fed to the output driver 48. It will be understood that the gain functions 58A and 48B can be dynamically adjusted in response to particular sensed disturbances for optimizing resistance to different modes of oscillation.

Thus the IPSS 20' of FIGS. 3, 6, and 10, the signal processing units 62, 62', and/or 62" of FIGS. 7, 8, and 9 can be applied to any energy storage, HVDC or generation system that has the capability to control real power and reactive power faster than the oscillation frequency. Since the battery PCS 64 of the energy storage plant 60 (FIG. 7) can control the reactive and the real power independently, it has been used as a test bed to observe the impact of damping oscillations of the network 10 by real power modulation. The testing has shown that modulating the MW output of the PCS 64, based on frequency deviation, provides an effective method to damp the power system oscillations. The initial tests were conducted on a relatively small Battery Energy Storage System (BESS); thus there was no significant impact on regional power oscillations of the WSCC network 10 of FIG. 1. The 10 MW size BESS, however, did provide some measurable results. It is believed that a much larger BESS or Super conducting Magnetic Energy Storage System (SMESS) can provide regional damping if the system has to be stabilized using these types of power devices alone. It is contemplated that the system stabilizer of the present invention be implemented on at least one of the larger power plants 12', or a significant percentage of the overall power capacity of the network 10.

The IPSS 20' of the present invention successfully controls inter-area or regional oscillations of a power system network by modulating machine power instead of the reactive power. This is done by extracting a frequency deviation error signal and injecting in the governor loop at an appropriate location. The frequency deviation error signal can be derived in one of several ways from a signal relating the system frequency or accelerating power signals, etc. The signal injection into the machine governor loop directly results in modulating the machine power output. It has been discovered that existing fast-acting machine governors can respond to the injected signal if it is injected at the appropriate location. Within the network 10 of FIG. 1, these faster governors have been installed on several of the larger generating machines within the Southwest region.

It will be appreciated that the transmission paths K(nm) in the network 10 of FIG. 1 are themselves distributed paths. As the system interconnections have grown and the systems have been loaded more and more, the frequency of oscillations that occur between the large masses or load centers in WSCC has historically been progressively reduced. the oscillations now occur in the frequency range that can be damped by governors. Also the field tests conducted on governor and excitation system response have shown that the state-of-the-art governors used on some machines can be made to act faster than the excitation system if the signal is injected at the right place.

Thus the IPSS 20' of the present invention enables larger power transmission over the existing transmission paths and also enhance system stability and reliability.

In further testing, an experimental prototype of the IPSS 20' of FIGS. 3–6 has been installed in an existing steam power plant wherein each machine governors has eight of the control valves 36 which open or close in a certain programmable fashion to produce minimum to maximum machine power. The real control signal output 34 of the IPSS 20' is fed either to one or two such valves which are held at the optimum opening level to provide maximum power change from the signals of the invention. The generators 13 are each 480 megawatt (MW) machines. The real control signal 34 is scaled to provide a 2.5% power change per valve. By applying this signal to more valves, the power modulation level can be increased. Also, the governor valve compensator 46 is configured to be most effective at the critical inter-area oscillation frequencies. The results of these additional field tests have shown that:

1. The IPSS 20' is capable of changing machine power output of a generator in response to an applied signal for frequencies from 0.2 Hz to 1.0 Hz. The DEH state-of-the-art governors are fast enough to respond to these frequencies with acceptable gain loss and phase displacement. Measurements for the gain and phase shift taken for the governor and the excitation system for two similar units show, for example, that the governor system response has a phase shift of less than 100 degrees up to 1.0 Hz and reaches 180 deg. At approximately 1.4 Hz. In contrast, the excitation system has a phase shift of approximately 100 degrees at 0.3 Hz and more than 180 degrees at 0.7 Hz.

2. The power output changes up to +/−5% of the machine output can be applied without any significant adverse impact on the machines. For a 480 MW machine it is limited to approximately +/−24 MW. This power change is obtained best by modulating two control valves out of the eight governor valves. Various combinations can be used and any operating point on these valves can be selected to optimize the overall plant performance. Presently, the middle approximate 50% of the flow range is preferred for high, relatively constant loop gain.

3. The IPSS 20' can work together with the power system stabilizers 20 which are presently applied on generator excitation systems. Basically, the existing power system stabilizer can be used for damping low levels of oscillations and can be in operation continuously, while activation of the real control signal 34 is when the frequency deviations are of larger magnitudes. A frequency dead band of 0.03 to 0.04 Hz was found to work satisfactorily.

Although the present invention has been described in considerable detail with reference to certain preferred versions thereof, other versions are possible. Therefore, the spirit and scope of the appended claims should not necessarily be limited to the description of the preferred versions contained herein.

What is claimed is:

1. In an electrical power distribution system having geographically separated plural generation stations and geographically separated loads, a network of transmission lines connected between the generation stations and the loads, at least a portion of the network transmitting alternating current power, a power control element connected to the network for variably feeding electrical power onto a portion of the network, and a main control system for setting a nominal real power operating point of the power control element, the improvement comprising:

(a) means for monitoring deviations in at least one of frequency and phase of the alternating current power;

(b) means for dynamically offsetting the real power operating point in response to the monitoring means.

2. The improved power distribution system of claim 1, wherein the power control element is in a power path of one of the generation stations.

3. The improved power distribution system of claim 2, wherein the one generation station further comprises an AC generator operatively connected to the power source and having an exciter input, a power system stabilizer being operatively connected to the exciter input for controlling and stabilizing reactive power of the generator.

4. The improved power distribution system of claim 3, wherein the one generation station includes an actuator control circuit for driving the control element in response to a power setting signal, the actuator control circuit incorporating a delay component, and the means for offsetting comprises an offset signal connection downstream of the actuator control circuit for bypassing the delay component.

5. The improved power distribution system of claim 3, wherein the monitoring means comprises a transducer for measuring rotational speed of the generator.

6. The improved power distribution system of claim 3, wherein the monitoring means comprises a transducer for measuring output phase deviations of the generator.

7. The improved power distribution system of claim 3, wherein the monitoring means comprises phasor data means for measuring output real power and reactive power of the generator, the power system stabilizer being responsive to the measured reactive power, the means for dynamically offsetting being responsive to the measured real power output.

8. The improved power distribution system of claim 7, wherein the phasor data means is connected to the network at a location geographically local to the AC generator.

9. The improved power distribution system of claim 7, wherein the phasor data means is connected to the network at a plurality of geographically spaced locations, the system further comprising a circuit for signaling differences in the measured phasor data from the spaced locations.

10. The improved power distribution system of claim 2, wherein the AC generator is a steam turbine generator and the power path is a steam conduit to the generator, and the power control element is a valve for variably restricting the steam conduit.

11. The improved power distribution system of claim 10, wherein the system includes a governor circuit for driving the valve in response to a power set point, the governor circuit having an integrator element for stabilizing the steam turbine generator by imparting a dynamic lag function, and wherein the means for dynamically offsetting the operating point is connected downstream of the integrator element for bypassing the lag function.

12. The improved power distribution system of claim 10, wherein the valve is at least one in a subset of control valves, each of the control valves being responsive to a respective opening signal, each opening signal being responsive to a respective nominal power setting, the at least one valve of the subset being additionally responsive to the monitoring means.

13. The improved power distribution system of claim 2, wherein the AC generator is a gas turbine generator and the power path is a fuel conduit to the generator, and the power control element is a valve for variably feeding the fuel.

14. The improved power distribution system of claim 13, wherein the valve is one of a plurality of fuel control valves, each of the control valves being responsive to a respective opening signal, each opening signal being responsive to a respective nominal power setting, the valve of the power control element being additionally responsive to the monitoring means.

15. The improved power distribution system of claim 2, wherein the monitoring means comprises a transducer for measuring a power output frequency of the one generation station.

16. The improved power distribution system of claim 1, wherein the monitoring means comprises a transducer for measuring an AC line frequency proximate the power control element.

17. The improved power distribution system of claim 16, wherein the transducer is a local transducer, and the monitoring means further comprises a remote transducer for measuring an AC line frequency at a geographically distant location of the network, and means for signaling a difference between the measured frequencies.

18. The improved power distribution system of claim 1, wherein the system has a local characteristic frequency being dominant under normal loading and a second characteristic frequency being dominant under high levels of power transfer between geographically distant locations, the second frequency being lower than the first frequency, the system further comprising:

(a) means for monitoring a threshold level of the deviations; and (b) means for inhibiting the means for dynamically offsetting until the deviations exceed the threshold level.

19. The improved power distribution system of claim 18, wherein the threshold level is at least approximately 0.03 Hz.

20. The improved power distribution system of claim 18, wherein the first characteristic frequency is greater than 1.4 Hz and the second characteristic frequency is less than 1.4 Hz.

21. The improved power distribution system of claim 1, wherein the system has a first characteristic frequency being dominant under high levels of power transfer between a first geographically distant location and a second and different characteristic frequency being dominant under high levels of power transfer between a second geographically distant location, and wherein the means for dynamically offsetting comprises:

(a) a first transfer path for damping oscillations at the first characteristic frequency; and (b) a second transfer path for damping oscillations at the second characteristic frequency.

22. The improved power distribution system of claim 1, wherein the means for dynamically offsetting has a range being not more than approximately plus to minus six percent of a full scale real power operating point of the power control element.

23. A method for improving stability of a power distribution system having geographically separated plural generation stations and geographically separated loads, a network of transmission lines connected between the generation stations and the loads, at least a portion of the network transmitting alternating current power, a power control element connected to the network for variably feeding electrical power onto a portion of the network, and a main control system for setting a nominal real power operating point of the power control element, the method comprising the steps of:

(a) monitoring deviations in at least one of frequency or phase of the alternating current power; and (b) dynamically offsetting the real power operating point in correspondence with the monitored deviations.

24. The method of claim 23, wherein the system has a first characteristic frequency under normal loading and a second characteristic frequency under high levels of power transfer between geographically distant locations, the second frequency being lower than the first frequency, the method comprising the further steps of:

(a) setting a threshold level of the monitored deviations; and (b) inhibiting the step of dynamically offsetting until the deviations exceed the threshold level.

25. The method of claim 24, wherein the inhibiting step is terminated when the threshold level exceeds approximately 0.03 Hz.

26. The method of claim 23, wherein the power control element includes a plurality of control valves for variably restricting a steam conduit of a steam power generator, each of the control valves being responsive to a respective opening signal, each opening signal being responsive to a respective nominal power setting, and wherein the step of dynamically offsetting includes offsetting the opening signal of at least one of the valves.

27. The method of claim 26, wherein the at least one valve of the subset has a transfer characteristic of relatively low gain in respectively small and large valve opening regions and relatively high gain in a medial valve opening region, the method comprising the further steps of:

(a) comparing an operating range of the at least one valve with a desired operating range being the medial valve opening region; and (b) adjusting a nominal setting of the at least one valve for centering the operating range thereof relative to the medial valve opening region.

28. The method of claim 26, wherein the step of offsetting the opening signal comprises scaling a dynamic range of the offsetting to between approximately 2.5% and approximately 5% of a maximum power output of the steam power generator.

29. The method of claim 23, wherein the step of monitoring comprises measuring frequency changes within a bandwidth of from approximately 0.2 Hz to approximately 1.0 Hz.

30. The method of claim 29, wherein the step of measuring is of frequencies geographically local to the power control element.

31. The method of claim 29, wherein the step of measuring is of frequencies at a plurality of geographically spaced locations, the method comprising the further step of comparing the geographically spaced measurements.

32. The method of claim 23, wherein the step of monitoring comprises the steps of:

(a) maintaining phasor data defining orthogonal real power and reactive vectors associated with the network geographically local to the power control element; and (b) determining deviations in phase of the real power vector.

33. The method of claim 32, wherein the phasor data is from a location on the network geographically local to the power control element.

34. The method of claim 32, wherein the phasor data is from a plurality of geographically spaced locations on the network, the method comprising the further step of comparing the geographically spaced measurements.

35. The method of claim 23, wherein the network is a three-phase network, and wherein the step of monitoring comprises the further steps of:

(a) maintaining a positive sequence vector defining a composite voltage phase and magnitude of the network; and (b) extracting the voltage phase from the vector.

36. A method for improving stability of a power distribution system having geographically separated plural generation stations and geographically separated loads, a network of transmission lines connected between the generation stations and the loads, at least a portion of the network transmitting alternating current power, a power control element connected to the network for variably feeding electrical power onto a portion of the network, and a main control system for setting a nominal real power operating point of the power control element, the method comprising the steps of:

(a) monitoring deviations in real power within a frequency bandwidth of between approximately 0.2 Hz and approximately 1.0 Hz; and (b) dynamically offsetting the real power operating point in correspondence with the monitored deviations.

37. The method of claim 36, wherein the step of monitoring comprises the steps of:

(a) maintaining phasor data defining orthogonal real power and reactive vectors associated with the network; and (b) extracting a real power component of the phasor data.

38. The method of claim 36, wherein the step of monitoring comprises the further steps of:

(a) maintaining a positive sequence vector defining a composite voltage phase and magnitude of the network; and (b) extracting the voltage magnitude from the vector.

* * * * *